Feb. 16, 1971 G. B. HARR 3,563,846
SELF-SEALING FUEL TANK
Filed Aug. 25, 1966

United States Patent Office 3,563,846
Patented Feb. 16, 1971

3,563,846
SELF-SEALING FUEL TANK
George B. Harr, Pasadena, Calif., assignor to The Firestone Tire & Rubber Company, Akron, Ohio, a corporation of Ohio
Filed Aug. 25, 1966, Ser. No. 574,978
Int. Cl. B32b 7/06; B65d 25/34
U.S. Cl. 161—161                                9 Claims

ABSTRACT OF THE DISCLOSURE

This invention relates to the protection of a fuel tank by an exterior composite laminate which comprises a layer of fuel-resistant sponge 0.020 to 0.125 inch thick adherently interposed between the fuel tank and a sealing layer. When the protected fuel tank of this invention is punctured by a projectile, the sponge layer is splittable so that the sealing layer separates from the tank wall around the puncture as the puncture is formed and the sealing layer swells when contacted by the fuel.

---

Figure 1:
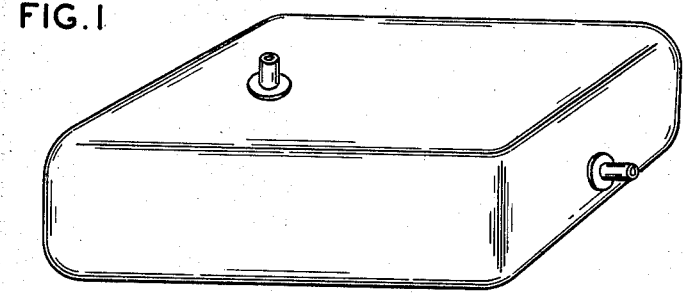

This invention relates to protection of a fuel tank such as is apt to be punctured by a projectile or the like, as in the instance of military operations. It applies to tanks to be used in air- and sea-craft and land vehicles.

The invention is applicable to a tank with a metal or rigid plastic body, and having an exterior self-sealing covering which pulls away from the body when the tank is punctured by a projectile. For convenience the rigid body will be more generally referred to herein as being of metal. The invention is applicable to a tank, the body of which is formed at least in part by the wing of an aircraft. It is also applicable to any type of tank that constitutes an integral part of the body or hull of aircraft.

The sealing layer of any fuel tank, usually a composite of more than one ply, when located exteriorly of the tank, must be bonded to the tank so that if the tank is pierced, fuel will not accumulate between the tank and this layer outside of the tank. Such an accumulation of liquid could cause tension on the bullet-sealing wall resulting in further separation of this layer from the tank body as well as making the fuel accumulated here unavailable to the fuel system. Such bonding is particularly necessary when an airplane wing serves as a part of the tank to insure that its exterior functions as an air foil.

Self-sealing (bullet-sealing) composites for fuel tanks are designed to function on the basis of three parameters:

(1) The puncture created must be quite small.
(2) The lips of the self-sealing composite must stay in place or realign themselves so that they oppose themselves after passage of the projectile.
(3) The composite must include a fuel-sensitive layer which swells when contacted by the fuel, preferably across opposing lips of the puncture, effectively sealing it.

When ordinary means is employed to bond the self-sealing layer to the exterior of the tank and the metal or plastic body petals inwardly, the self-sealing layer is pulled into the puncture, preventing closure of the wound.

The self-sealing composite of this invention seals over a puncture even though the metal petals inwardly. This self-sealing composite separates from the metal and retains or regains substantially its original position, and seals itself across the opening. Any tearing or distortion of the self-sealing composite is made to terminate at the edge of the distortion of the metal. To accomplish this, a thin layer of a fuel-resistant, cellular, splittable material (herein more generally referred to as sponge) is interposed between any conventional self-sealing layer and the metal of the tank. This thin layer functions as a splitting layer, so that the self-sealing composite separates from the body around the opening. The fuel causes the fuel-sensitive ply of this self-sealing composite to swell and close the puncture.

It is important that the splittable sponge layer and the adhesive which bonds it to the tank be highly fuel resistant, so that neither this layer nor the adhesive is adversely influenced by exposure to fuel. The tear-resistant properties of the sponge must be such that the various forces, such as hydraulic head, acting against the exposed self-sealing layer will not allow the tearing to propagate.

The tank wall of this invention comprises three different layers, viz. (1) an inner fuel-confining rigid wall of metal or plastic which petals inwardly when pierced by a projectile, (2) an outer resilient, memory retaining, self-sealing composite which includes a fuel-sensitive layer, and (3) a sponge which is intermediate the sealing composite and the metal and joined thereto. When the wall is pierced by a projectile, the entire wall flexes inward with the projectile. Then the sealing composite snaps back, tearing the intermediate sponge layer. During the forward motion the metal splits, supplying a starting point for tear initiation of the sponge. The self-sealing composite must be resilient. If any portion of the covering outside of the sponge is so stiff that it acts as a back-up plate, a portion of the wall which includes the sealing layer is cored out, and this is undesirable. The sponge is soft and easily compressed, hence does not contribute to coring. The preferred embodiment of the invention includes adhesive between the sponge and the metal. The sealing composite includes adhesive which unites it to the sponge. In the preferred structure, the layer of adhesive in the composite is very thin, in order to bring the fuel-sensitive layer close to the sponge.

Figure 2:
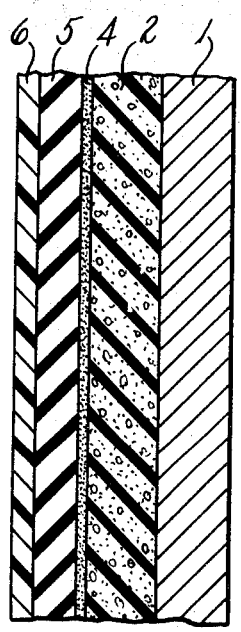
Figure 3:
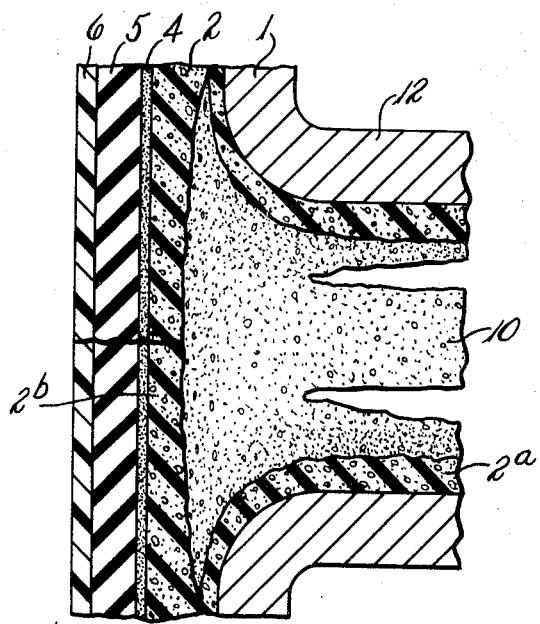

The invention is further described in connection with the accompanying drawings, in which—
FIG. 1 is a view in perspective of the simplest form of a fuel tank;
FIG. 2 is an enlarged section through a wall of the tank; and
FIG. 3 is a view of the same after being punctured by a projectile.

It is understood that the tank may be any desired shape. It is constructed to be self-sealing after being punctured by shrapnel or other projectile.

In the drawing, the tank wall 1 is covered externally by the cellular elastomeric layer or sponge 2 which is quite thin. It must be at least 0.020 inch thick, and will generally be about 0.0625 to 0.125 inch thick, although it might be somewhat thicker. It is not practical to laboratory-test its tear value at the speed of a projectile, but tested at a jaw-separation speed of 2 inches per minute it has a tear value of less than 3 pounds per inch.[1] The tear characteristics of the splittable sponge must be low to permit the composite to separate from the metal and remain in its original position or to return to this position after puncturing. Systems designed for protection at the 50-caliber level will employ heavier sealing composites, permitting the use of a stronger splittable sponge than systems designed for protection against a lower-caliber level.

The hardness of the metal or plastic body of the tank also influences the performance of the entire composite and the selection of the splittable layer. Softer metals petal inwardly to a much higher degree than harder metals; the latter tend to chunk or shatter. The gauge of the metal

---

[1] The test is essentially that specified for determining friction between rubber and fabric per Federal Test Method Standard 601, Method 8011, paragraph 4.2. The test specimen consists of metal/adhesive/sponge/adhesive/nitrile-rubber coated fabric. Tear is initiated in the sponge by cutting at the open one-inch-wide end.

or plastic also influences the activity of the puncture and the construction of the splittable sponge and the sealing composite are advantageously adjusted accordingly.

In the particular embodiment of the invention illustrated in the drawing, the fuel-resistant sponge 2 is split (FIG. 3) at about its middle by the projectile 3, with the interior half 2a adhering to the wall 1 and the exterior half 2b adhering to the self-sealing layer 5 (described below). The splittable sponge 2 may be a foam of polyether-type polyurethane with about 100 cells per inch. Alternatively, a blown sponge of nitrile rubber (butadiene-acrylonitrile copolymer) may be used and has this advantage, that it is a closed-cell type of sponge and stops the loss of fuel. Any fuel-resistant sponge of the required tear value may be used.

The adherent 4 bonds the sealant 5 to the foam. This adherent is applied to the foam and may, for example, be a gum stock of the following composition, about .010 inch thick:

| | Parts by weight |
|---|---|
| Acrylonitrile-butadiene rubber | 100 |
| Semi-reinforcing furnace black | 55 |
| Plasticizer | 15 |
| Accelerator | 1 |
| Zinc oxide | 5 |
| Sulfur | 1 |

Alternatively, the adherent may be a plastic interliner (composed, for example, of polyurethane) of about the aforesaid thickness. It may be a calendered stock or it may be sprayed on to the foam.

The fuel-sensitive or sealant layer 5 is an elastomer which swells in fuel. It may be 0.02 to 0.10 inch thick, but is preferably about 0.03 to 0.06 inch thick. It seals over the opening formed by the projectile. This sealant may be composed entirely of natural rubber, or it may contain butadiene-styrene rubber (SBR) or other fuel-swelling synthetic. Such sealants are well known in the art. A preferred composition is:

| | Parts by weight |
|---|---|
| Mill-massed Hevea | 100 |
| Extra light calcined MgO | 5 |
| Rosin, wood | 5 |
| Sulfur | 1 |

The sealant is enclosed in the outer covering 6, which may be composed of nylon, glass or other fabric spray-coated to any desired thickness with an elastomer, e.g. polyurethane; or it may be calendered with an oil-resistant rubber which may be the acrylonitrile-butadiene rubber compound described above; or this outer covering 6 may be a plastic sheet such as polyurethane, for example, which can be sprayed over the sealant. The covering 6 forms with the sealant 5 and adhesive 4 a memory-retaining composite which retains its original position or springs back to its original position as the foam layer splits.

Outer coverings 6 which have proved satisfactory include:

(1) Fabric similar to that designated as Type 5 or Type 9A of MIL-C-17415E or the same base fabrics coated with an acrylonitrile coating such as:

| | Parts by wt. |
|---|---|
| Acrylonitrile-butadiene rubber | 100 |
| Intermediate-super-abrasion furnace black | 50 |
| Plasticizer | 20 |
| Resinous tackifier | 5 |
| Accelerator | 1 |
| Zinc oxide | 5 |
| Sulfur | 1.5 |

(2) A polyurethane calendering compound such as:

| | Parts by wt. |
|---|---|
| Millable-polyester-urethane rubber | 100 |
| Super abrasion furnace black | 25 |
| Accelerator | 6 |
| Accelerator activator | 1 |
| Sulfur | 2 |
| Cadmium stearate | 0.5 |
| Plasticizer | 5 |

(3) A liquid polyurethane composition applied by means of suitable spray equipment. Such a material might have the following composition:

| | Parts by wt. |
|---|---|
| Liquid polyether-polyurethane pre-polymer | 100 |
| Aromatic diamine curing agent | 12 |
| Methyl ethyl ketone | 45 |
| Mesityl oxide | 75 |

FIG. 3 indicates that when the tank has been punctured at 10 by a bullet 3 or the like, the tank wall 1 petals inwardly to form petals 12. The area 10 is a relatively small area, of the order of perhaps 1 or 1½ inches across, more or less, and the memory-retaining sealing composite 5, 6—even though deflected inwardly by the bullet that forms the puncture—is returned to its initial position and when contacted by the fuel, the fuel-sensitive layer 6 swells and seals itself together at the ruptured edges 7 to retain the fuel.

I claim:
1. A vehicular fuel tank having a rigid wall which wall petals inwardly when punctured by a projectile piercing it from the outside, a sealing layer outside of the wall which has sufficient memory to retain or return substantially to its original position when the wall is petaled and which layer is sufficiently resilient to prevent coring when hit externally by a projectile, and between said wall and sealing layer a fuel-resistant sponge 0.020 to 0.125 inch thick which has a tear value of less than 3 pounds per inch, the sponge being adhered to the wall and to the sealing layer, which sponge is splittable so that the sealing layer separates from the wall around the puncture as the puncture is formed, which sealing layer swells when contacted by the fuel.

2. The tank of claim 1 in which the rigid wall is metal.
3. The tank of claim 1 in which the sponge is polyurethane.
4. The tank of claim 1 in which the sponge is a closed-cell sponge.
5. The tank of claim 4 in which the sponge is blown acrylonitrile-butadiene rubber.
6. The tank of claim 1 in which the wall is metal and the sealing layer includes natural rubber adhered to the sponge by a gum layer of polyether polyurethane.
7. The tank of claim 1 in which there is a fabric outside of said sealing layer.
8. The tank of claim 1 in which the sealing layer of the composite is polyurethane.
9. The tank of claim 1 in which the sponge is 0.062$^{5}$ to 0.125 inch thick.

References Cited
UNITED STATES PATENTS

| | | | |
|---|---|---|---|
| 1,386,791 | 8/1921 | Murdock | 161—405 |
| 1,406,667 | 2/1922 | Macbeth | 220—63 |
| 2,425,514 | 8/1947 | Dasher et al. | 220—63 |
| 2,715,085 | 8/1955 | Boger | 161—405 |
| 3,236,007 | 2/1966 | Abeson | 161—160UX |

WILLIAM J. VAN BALEN, Primary Examiner

U.S. Cl. X.R.

161—165, 405; 220—63; 150—0.5